United States Patent [19]
Okamoto et al.

[11] Patent Number: 5,672,324
[45] Date of Patent: Sep. 30, 1997

[54] ELECTRICALLY HEATABLE HONEYCOMB BODY OF A CATALYTIC CONVERTER EQUIPPED IN AN EXHAUST SYSTEM OF AN INTERNAL COMBUSTION ENGINE

[75] Inventors: Atsuya Okamoto; Akikazu Kojima; Niro Takaki; Kiyohiko Watanabe, all of Nishio, Japan

[73] Assignee: Nippon Soken, Inc., Nishio, Japan

[21] Appl. No.: 601,581

[22] Filed: Feb. 14, 1996

[30] Foreign Application Priority Data

Feb. 17, 1995 [JP] Japan .................. 7-053438

[51] Int. Cl.⁶ .................................................. F01N 3/10
[52] U.S. Cl. .................. 422/174; 422/173; 422/180; 422/199; 422/222; 60/300
[58] Field of Search .................. 422/174, 173, 422/180, 198, 199, 222; 60/300; 219/501, 552, 553; 392/485, 488

[56] References Cited

U.S. PATENT DOCUMENTS

| | | | |
|---|---|---|---|
| 3,770,389 | 11/1973 | Kitzner et al. | 422/174 |
| 4,976,929 | 12/1990 | Cornelison et al. | 422/174 |
| 5,070,694 | 12/1991 | Whittenberger | 422/174 |
| 5,163,291 | 11/1992 | Hitachi et al. | 60/299 |
| 5,215,722 | 6/1993 | Nishizawa | 422/174 |
| 5,322,672 | 6/1994 | Breuer et al. | 422/180 |
| 5,529,759 | 6/1996 | Sanada et al. | 422/174 |

FOREIGN PATENT DOCUMENTS

| | | |
|---|---|---|
| 3-500911 | 2/1991 | Japan . |
| 5-220404 | 8/1993 | Japan . |
| 5-237396 | 9/1993 | Japan . |

*Primary Examiner*—Robert J. Warden
*Assistant Examiner*—Hien Tran
*Attorney, Agent, or Firm*—Cushman Darby & Cushman Intellectual Property Group of Pillsbury Madison & Sutro LLP

[57] ABSTRACT

An electric heater comprises a central electrode and a ring electrode with a honeycomb heat generator disposed therebetween. The honeycomb heat generator is formed by winding a conductive foil strip around the central electrode until the size of the rolled honeycomb body just fits to the ring electrode. The surface of the conductive foil strip is coated by an insulating material, thereby preventing a short circuit between two layers of the conductive foil strip wound around the central electrode. A plurality of bonding parts are provided to electrically connect adjacent layers of the conductive foil strip wound around the central electrode. The bonding parts are disposed along a plurality of bonding lines extending across the layers of the conductive foil strip. The bonding parts are disposed on every other bonding line along each layer of the conductive foil strip.

18 Claims, 7 Drawing Sheets

ELECTRICALLY HEATABLE HONEYCOMB BODY OF A CATALYTIC CONVERTER EQUIPPED IN AN EXHAUST SYSTEM OF AN INTERNAL COMBUSTION ENGINE

BACKGROUND OF THE INVENTION

1. Field of the Invention

This invention generally relates to an electrically heatable member used in an exhaust emission purification apparatus incorporated in an exhaust system of an internal combustion engine, and more particularly, to an electric heater arranged in the exhaust emission purification apparatus, such as a refreshing heater, which burns up exhaust particulate trapped by a honeycomb filter equipped in an exhaust passage of a diesel engine, or a warm-up heater, which increases the temperature of a catalyst equipped in an exhaust passage of a gasoline engine when the catalyst is not activated.

2. Related Art

Unexamined Japanese Patent Application No. HEI 5-237396, published in 1993, discloses an electrically heatable honeycomb filter provided in an exhaust passage for collecting or trapping exhaust particulate emitted from an internal combustion engine, such as a diesel engine. An electric heater incorporated in such a honeycomb filter is periodically turned on to burn up exhaust particulate trapped in this honeycomb filter, thereby refreshing or cleaning up the numerous narrow gas flow passages in the honeycomb filter.

FIGS. 7A and 7B cooperatively show one example of an electric heater assembled with such a honeycomb filter. A conductive foil strip 3a, such as a stainless sheet, is wound around a central stick electrode (i.e. plus electrode) 1 in a scroll fashion, so as to form a multi-layered heat generator 3 between the central electrode 1 and a ring electrode (i.e. minus electrode) 2.

The conductive foil strip 3a, stretched in its lengthwise direction, is constituted by bonding (for example, welding) a flat foil sheet 31 and a corrugated foil sheet 32, as shown in FIG. 7A. The surface of the conductive foil strip 3a is finished by applying an insulating coat film. The conductive foil strip 3a, secured to the central electrode 1 at one end thereof, is wound around the central electrode 1 until it forms a predetermined sized scroll body.

The conductive foil strip 3a is inserted or placed inside the ring electrode 2 and supported by the circular rim of the ring electrode 2. The other end of the conductive foil strip 3a, i.e. the radially outermost end of the elongated conductive foil strip 3a, is connected to the ring electrode 2, as shown in FIG. 7B, thereby constituting the multi-layered heat generator 3.

According to the above-described electric heater, upon applying a voltage between electrodes 1 and 2, electric current flows across the multi-layered heat generator 3 along a spiral layout of the conductive foil strip 3a from its innermost end to the outermost end, as shown by an arrow in FIG. 7B. Applying electric current to the entire body of the conductive foil strip 3a uniformly increases the temperature of multi-layered heat generator 3. Thus, the heat generator 3 heats up an exhaust particulate trap filter, which disposed closely and in an opposed relation thereto by convection and heat radiation transmission therefrom, thereby burning up and removing the trapped exhaust particulate.

However, the arrangement of the above-described electric heater is not desirable in that the support of multi-layered heat generator 3 is not stable because layers of the heat generator 3 are not connected with each other, although the innermost layer and the outermost layer are fixed to the electrodes 1 and 2, respectively. More specifically, due to the nature of spiral arrangement, the intermediate layers of the heat generator 3 tend to slide in the axial direction of the heat generator 3 when subjected to vibrations, for example in the installation to the vehicle body, or the increased flow of exhaust gas for a long time.

Even if such a slide movement is small between adjacent two intermediate layers, an entire dislocation of the telescopically protruding edge will be significantly large, as shown in FIG. 9A. A worst case resulting from such a telescopic dislocation would be a corruption of the heat generator 3 as shown in FIG. 9B.

To prevent such problems, it is possible to weld two adjacent conductive foil layers at predetermined angular portions along a circumferential direction as shown in FIGS. 8A and 8B, wherein reference numeral 33 represents a welding point.

However, according to this welding arrangement shown in FIGS. 8A and 8B, electric current will flow from a welding point 33 to the closest welding point 33, forming a short-circuit path as shown by an arrow in FIG. 8A. Thus, the overall resistance of the electric heater will be substantially reduced such that sufficient heat generation cannot be expected.

Furthermore, as electric current flows locally (i.e. along the short-circuit path connecting closest welding points), the surface of heat generator 3 is not entirely heated up and, as a result, the trap filter cannot uniformly burn up exhaust particulate.

SUMMARY OF THE INVENTION

Accordingly, in view of above-described problems encountered in the related art, a principal object of the present invention is to provide an excellent electric heater incorporated in an exhaust emission purification apparatus equipped in an automobile exhaust system, which is capable of maintaining an adequate electric resistance and assuring uniform heat generation across the surface of the heat generator, without causing a telescopic dislocation of multi-layered conductive foil layers.

In order to accomplish this and other related objects, a first aspect of the present invention provides an excellent electric heater incorporated in an exhaust emission purification apparatus for an internal combustion engine. A pair of first and second electrodes are provided. A multi-layered honeycomb body, acting as a heat generator, is disposed between these first and second electrodes. The multi-layered honeycomb body comprises a plurality of conductive foil layers. Each of these conductive foil layers is electrically insulated from other conductive foil layers.

A plurality of bonding parts electrically connect these plural conductive foil layers. The bonding parts are alternately aligned along a plurality of bonding lines extending across the plural conductive foil layers. Any two bonding parts aligned on the same bonding line are not consecutive between neighboring two conductive foil layers. Furthermore, any two bonding parts are not consecutively disposed between neighboring two imaginary bonding lines.

According to features in the preferred embodiments of the present invention, the first and second electrodes are a combination of a stick electrode and a ring electrode. The stick electrode is disposed at the center of the ring electrode. The bonding lines extend in predetermined radial directions from the stick electrode.

Furthermore, the multi-layered honeycomb body is formed by winding a conductive foil strip around the stick electrode in a scroll fashion, and the number of bonding lines is an odd number.

Alternatively, the multi-layered honeycomb body is formed by independent conductive foil ring layers assembled in a concentric manner between the stick electrode and the ring electrode, and the number of bonding lines is an even number.

It is preferable that bonding lines are uniformly spaced around the stick electrode at equal angular intervals.

Furthermore, according to further features of the preferred embodiments, the first and second electrodes are a combination of two parallel electrodes, the multi-layered honeycomb body is disposed between the two parallel electrodes, and the bonding parts are aligned along plural bonding lines extending in the direction perpendicular to the two parallel electrodes.

In this case, the multi-layered honeycomb body may have a separate multi-layer construction where each conductive foil layer is electrically independent of other conductive foil layers at opposite ends thereof. In this case, the number of the bonding lines is an odd number. It is preferable that outermost imaginary bonding lines are put on opposite edges of the honeycomb body.

Alternatively, the multi-layered honeycomb body may have a continuous multi-layer construction where each conductive foil layer is electrically connected to an adjacent conductive foil layer at one of opposite ends thereof. In this case, the number of the bonding lines is an even number, and outermost bonding lines are offset from opposite edges of the honeycomb body.

It is preferable that each conductive foil layer is constituted by a flat foil sheet and a corrugated foil sheet, and the flat foil sheet is alternately folded at opposite ends of the honeycomb body, so that adjacent two conductive foil layers are electrically connected through the flat foil sheet.

Furthermore, each bonding part fully extends along the entire width of the flat foil sheet and the corrugated foil sheet, so as to provide excellent bonding parts whose total electric resistance is smaller than an electric resistance of the remainder of the honeycomb body.

Moreover, it is possible to provide an auxiliary bonding part in the vicinity of the bonding part.

Yet further, it will be preferable to provide an intermediate ring electrode between the stick electrode and the ring electrode in a concentric manner, so as to separate the honeycomb body into inner and outer heat generating zones.

In this case, the number of the bonding lines can be differentiated between the inner and outer heat generating zones. For example, when the number of bonding lines in the outer heat generating zone is smaller than the number of bonding lines in the inner heat generating zone, it becomes possible to increase a heat generation amount at the outer heat generating zone.

Furthermore, a second aspect of the present invention provides an electric heater incorporated in an exhaust emission purification apparatus for an internal combustion engine. There are provided first and second electrodes. A multi-layered honeycomb body is disposed between the first and second electrodes for acting as a heat generator. The multi-layered honeycomb body comprises a plurality of conductive foil layers each being electrically insulated from other conductive foil layers.

A plurality of bonding parts electrically connect these plural conductive foil layers. The bonding parts are alternately aligned along a plurality of bonding lines extending across the plural conductive foil layers.

When "n" bonding parts are aligned on a same imaginary bonding line, a k-th bonding part connects (2k−1) and 2k conductive foil layers, where k=1, 2, - - - , n. Meanwhile, when "m" bonding parts are aligned on a neighboring imaginary bonding line, a j-th bonding part connects 2j and (2j+1) conductive foil layers, where j=1, 2, - - - , m.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Figure 1A:
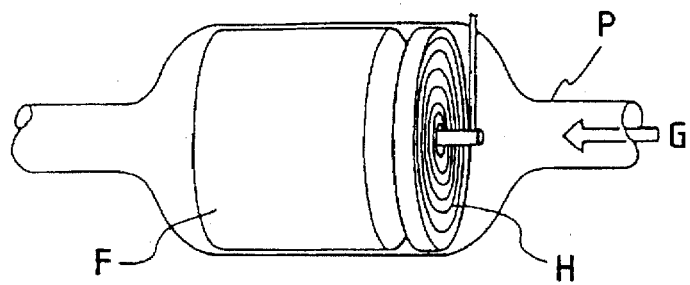
FIG. 1A is a view showing a schematic arrangement of an exhaust emission purification apparatus equipped with an electric heater in accordance with a first embodiment of the present invention.

Preferred embodiments of the present invention will be explained in greater detail hereinafter, with reference to the accompanying drawings. Identical parts are denoted by identical reference numerals throughout the views.

The present invention is embodied as an electric heater incorporated in an exhaust particulate purification apparatus equipped in an exhaust passage of a diesel engine.

In FIG. 1A, a trap filter "F" having a honeycomb body is disposed in an exhaust pipe "P" of a diesel engine (not shown). An electric heater "H" of the present invention is disposed upstream of the trap filter "F" in a confronting relation to the trap filter "F". In the drawing, letter "G" shows the direction of exhaust gas flow.

Figure 1B:
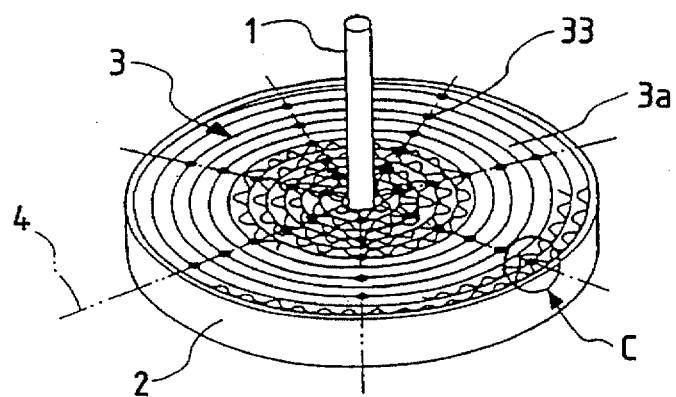
FIG. 1B is a perspective view showing an overall construction of the electric heater in accordance with the first embodiment of the present invention.

FIG. 1B shows the detailed construction of electric heater "H". A conductive foil strip 3a, such as a stainless sheet, is wound around a central stick electrode (i.e. plus electrode) 1 in a scroll fashion so as to form a multi-layered heat generator 3 between the central electrode 1 and a ring electrode (i.e. minus electrode) 2.

Figure 1C:
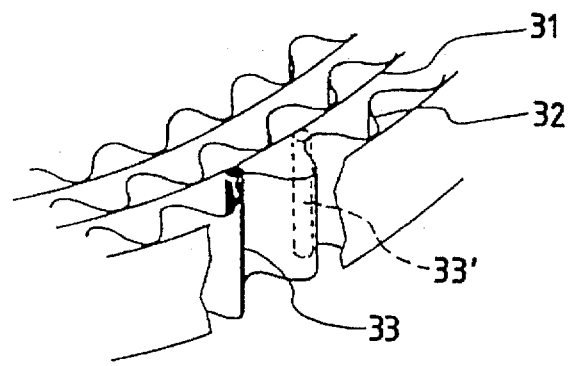
FIG. 1C is an enlarged view showing the detailed construction of part "C" shown in FIG. 1B.

The multi-layer heat generator 3 has a honeycomb body constituted by alternately assembled flat foil sheets 31 and corrugated foil sheets 32, as shown in FIG. 1C. More specifically, a flat foil sheet 31 and a corrugated foil sheet 32 which are bonded (for example, welded) together forms a conductive foil strip 3a extending in its lengthwise direction. Then, the surface of the conductive foil strip 3a is entirely coated by insulating material.

The conductive foil strip 3a, after being secured to the central electrode 1 at one end thereof, is wound around the central electrode 1 until it forms a predetermined size scroll body. Then, the body of the thus wound conductive foil strip 3a is inserted or coupled inside the ring electrode 2 and supported by the circular rim of the ring electrode 2.

The other end of the conductive foil strip 3a, i.e. the radially outermost end of the elongated conductive foil strip 3a, is electrically connected to the ring electrode 2, thereby constituting the multi-layered heat generator 3. In this case, the multi-layered heat generator 3 formed between electrodes 1 and 2 comprises a plurality of concentric layers mutually insulated at their circumferential boundaries.

Next, two adjacent layers of the conductive foil strip constituting the honeycomb body of multi-layered heat generator 3 are bonded at a plurality of points 33 by brazing or laser welding, so as to form a plurality of conductive paths between adjacent mutually insulated conductive layers.

The bonding parts 33 are provided along a plurality of bonding lines 4 each extending in a predetermined radial direction from the central electrode 1 along the flat surface of the disk-shaped heat generator 3.

A plurality of bonding parts 33 are alternately disposed along each bonding line 4. More specifically, when a group of bonding parts 33 are aligned on the same bonding line 4, these bonding parts 33 are aligned in such a manner that any two bonding parts 33 are not consecutively disposed between neighboring two boundaries of the layers of conductive foil strip 3a.

Furthermore, the bonding parts 33 are alternately disposed along the boundary of conductive foil layers (i.e. in the lengthwise direction of each layer), such that any two bonding parts 33 located in the same conductive layers are not located between neighboring two bonding lines 4.

For example, if a total of "n" bonding parts 33 are allocated on a same bonding line 4, a first bonding part 33 connects first and second layers, a second bonding part 33 connects third and fourth layers, - - - , a k-th bonding part 33 connect (2k–1) and 2k layers (k<n), - - - , and an n-th bonding part 33 connect (2n-1) and 2n layers.

Meanwhile, if a total of "m" bonding parts 33 are allocated on a neighboring bonding line 4, a first bonding part 33 connect second and third layers, a second bonding part 33 connect fourth and fifth layers, - - - , a k-th bonding part 33 connect 2j and (2j+1) layer (j<n), , and an m-th bonding part 33 connect 2m and (2n+1) layers.

To satisfy the above-described alternate arrangement of bonding parts 33, it is fundamentally necessary that the number of bonding lines 4 is an odd number (e.g. seven in the embodiment shown in FIG. 1B) when the multi-layered heat generator 3 is constituted by the strip layer wound around the central electrode 1 in a scroll fashion.

To obtain the best result, it is preferable that the bonding lines 4 are uniformly spaced around central electrode 1 at equal angular intervals. For example, an angular difference between adjacent bonding lines 4 and would be 51.4 degree (=360°/7).

As the electric resistance is proportional to the length of a given electric current path, it will be preferable to adequately select the number of bonding lines 4.

Furthermore, as shown in FIG. 1C, it is desirable that each bonding part 33 between flat foil sheet 31 and corrugated foil sheet 32 is fully extended along the entire width thereof, so as to provide excellent bonding parts 33 whose total electric resistance is smaller than the electric resistance of the remainder of heat generator 3.

Providing such a fully extended bonding part 33 is preferable to assure smooth flow of electric current and to avoid undesirable local heat generation. In a further embodiment, as shown by a dot line in FIG. 1C, an auxiliary bonding part 33' is provided in the vicinity of each or some of bonding parts 33 to increase the reliability of the connection between conductive layers (i.e. prevent of an undesirable increase in the electric resistance at the bonding part 33).

The operation of the above-described electric heater will be explained hereinafter with reference to FIG. 2.

For the purpose of simplifying the explanation, the number of bonding lines 4 is reduced to three in this drawing. However, its fundamental operation is not changed by the change of total number of bonding line 4.

Figure 2:
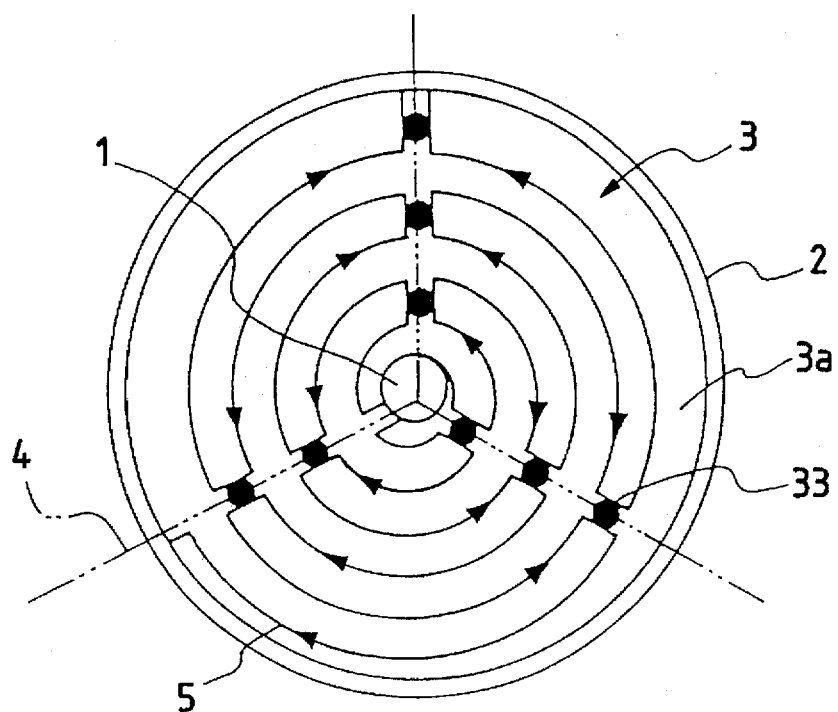
FIG. 2 is a schematic view illustrating an operation of the electric heater in accordance with the first embodiment of the present invention.

In FIG. 2, electric current basically flows in the circumferential direction (i.e. along the lengthwise direction of each layer) since the adjacent layers are insulated at the boundary thereof due to the presence of the insulating coat except at each bonding part 33. As adjacent layers are electrically conductive with each other at the bonding parts 33 provided at plural points along the boundary thereof, electric current starting from the central electrode 1 flows or transits from one layer to the outer layer through the nearest bonding part 33.

More specifically, the present invention alternately provides plural bonding parts 33 along the bonding line 4, so that any two bonding parts 33 allocated on the same bonding line 4 are not consecutive between adjacent boundaries of the layers of conductive foil strip 3a.

Furthermore, the bonding parts 33 are alternately aligned along the circumferential direction (i.e. the lengthwise direction of each layer of conductive foil strip 3a) such that any two bonding parts 33 allocated on the same layer are not located between adjacent bonding lines 4.

Hence, electric current flows in a zigzag fashion along a current path 5 connecting concentric arcs within a sector formed between bonding lines 4, as shown by an arrow in FIG. 2.

Accordingly, the electric resistance becomes a value proportional to the entire length of the current path 5 between electrodes 1 and 2, and it will become possible to generate a desirable amount of heat. Furthermore, it becomes possible to eliminate any local concentration in the heat generation, thereby realizing uniform heat generation across the entire surface of heat generator 3. Moreover, each layer of conductive foil strip 3a constituting the heat generator 3 is firmly fixed to the adjacent layer in conductive foil layers 3a through plural bonding parts 33. This bonding arrangement makes it possible to prevent the heat generator 3 from causing the telescopic dislocation of spirally wound layers even when it is subjected to severe vibrations or increased flow of exhaust gas for a long time.

The present inventors have demonstrated the effect of the present invention by fabricating a prototype electric heater shown in FIG. 1. Practical dimensions of the prototype electric heater are as follows: the diameter of central electrode 1 is 8mm; the diameter of ring electrode 2 is 98.6mm; the height of heat generator 3 is 13mm; and a cell height of heat generator 3 is 1.3mm. The number of imaginary bonding lines 4 is seven.

To compare the effect of the prototype electric heater with the prior art, the inventors have also fabricated a comparative electric heater having a conventional structure where a total of seven conductive foil strips are arranged in parallel and wound around central electrode 1 to form a conventional heater having substantially the same size as that of the present invention.

According to the results of conducted tests, both of electric heaters have generated same 2.18kW when 24 V is applied between their electrodes. Hence, it has been proved through this demonstration that the present invention can provide an excellent electric heater capable of preventing any troublesome telescopic dislocation from occurring among the spirally wound layers while assuring substantially the same performance as the conventional electric heater.

Figure 1D:
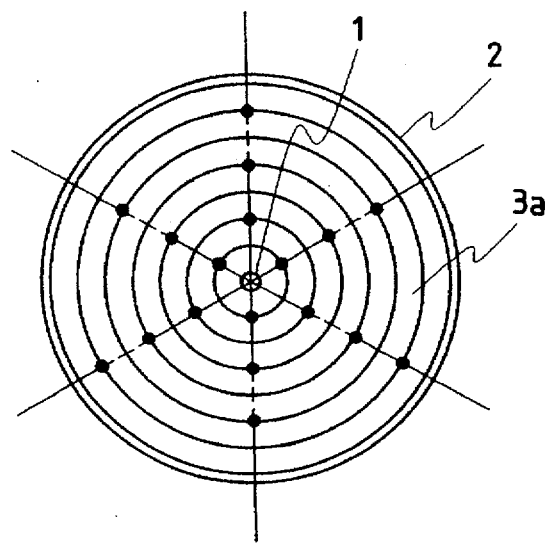
FIG. 1D is a plan view showing a modified electric heater of the first embodiment of the present invention.

Although the above-described first embodiment is explained based on the heat generator 3 constituted by the conductive foil strip 3a wound around the central electrode 1 in a scroll fashion, it is needless to say that the heat generator 3 of the first embodiment can be replaced by a similar heat generator which is constructed by independent ring layers arranged in a concentric manner as shown in FIG. 1D.

In this modified embodiment, the number of bonding lines 4 must be an even number to realize the above-described alternate arrangement for the bonding parts 33.

Figure 3:
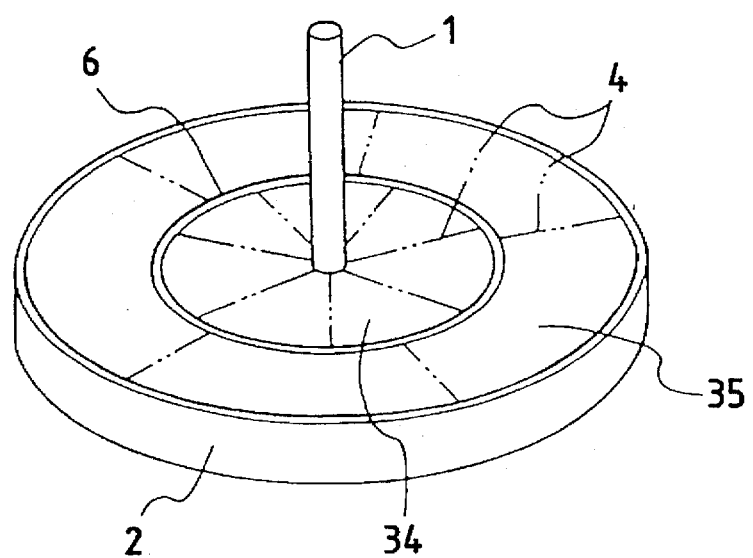
FIG. 3 is a perspective view showing an overall construction of another electric heater in accordance with a second embodiment of the present invention.

FIG. 3 shows a second embodiment of the present invention.

The second embodiment is characterized in that an intermediate ring electrode 6 is provided between the central electrode 1 and the outer ring electrode 2 in a concentric manner. The intermediate ring electrode 6 separates the heat generator into two zones, i.e. an inner heat generating zone 34 and an outer heat generating zone 35.

According to the arrangement of the second embodiment, it becomes possible to independently change the number of bonding lines 4, in each of the inner and outer heat generating zones 34 and 35.

As the electric resistance is generally proportional to the length of a given current path, changing the number of bonding lines 4 makes it possible to arbitrarily change the heat generation amount in each of the separated heat generating zones 34 and 35.

For example, in FIG. 3, the inner heat generating zone 34 has a total of seven bonding lines 4, while the outer heat generating zone 35 has only five bonding lines 4. With this arrangement, the outer heat generating zone 35 can increase the heat generation amount. It will be advantageous when the temperature of the outer peripheral region of the trap filter does not increase as intended, due to excessive heat radiation from the peripheral surface of the filter body. Thus, the second embodiment of the present invention can realize the effective and precise heat generation.

The number of bonding lines 4 in each of the inner heat generating zone 34 and the outer heat generating zone 35 can be arbitrarily changed. Moreover, it is possible to provide a plurality of intermediate electrodes 6 between central and outer electrodes 1 and 2 in accordance with a requested distribution of heat generation.

Figure 4:
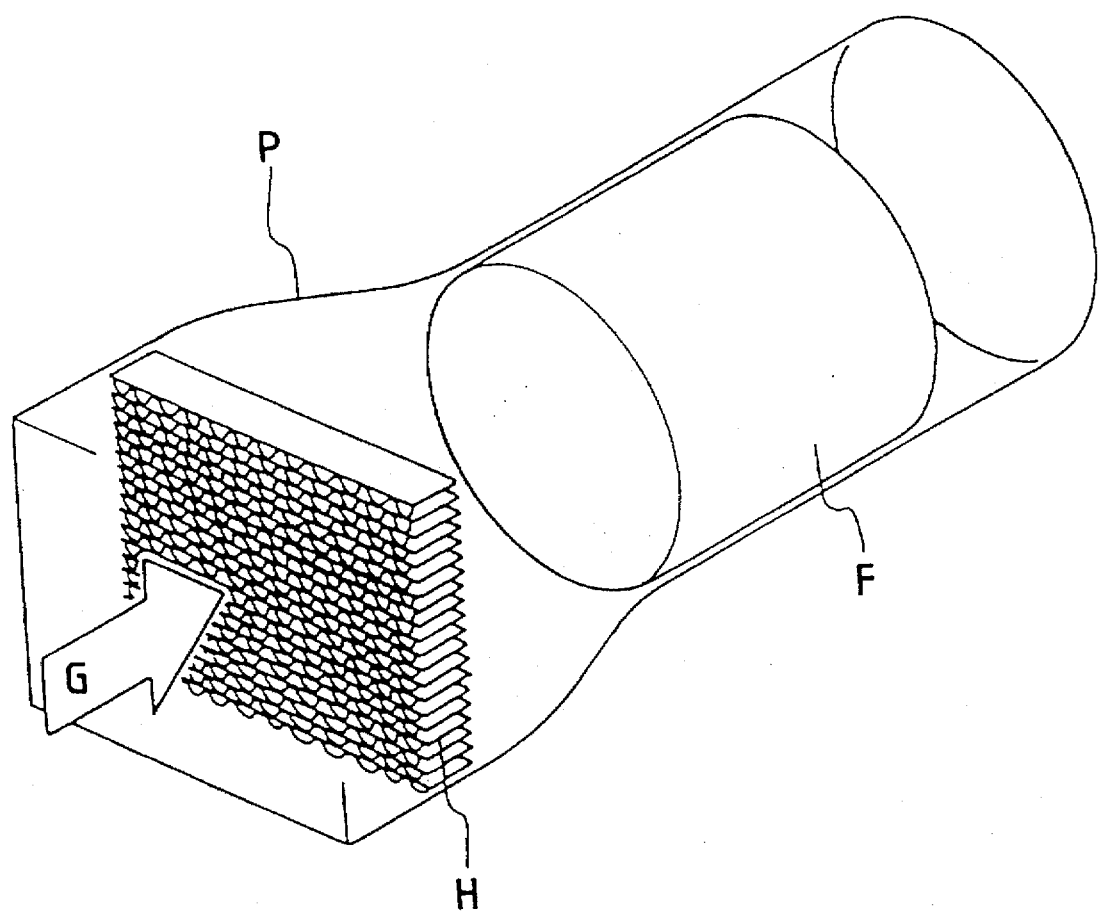
FIG. 4 is a view showing a schematic arrangement of an exhaust emission purification apparatus equipped with an electric heater in accordance with a third embodiment of the present invention.
Figure 5:
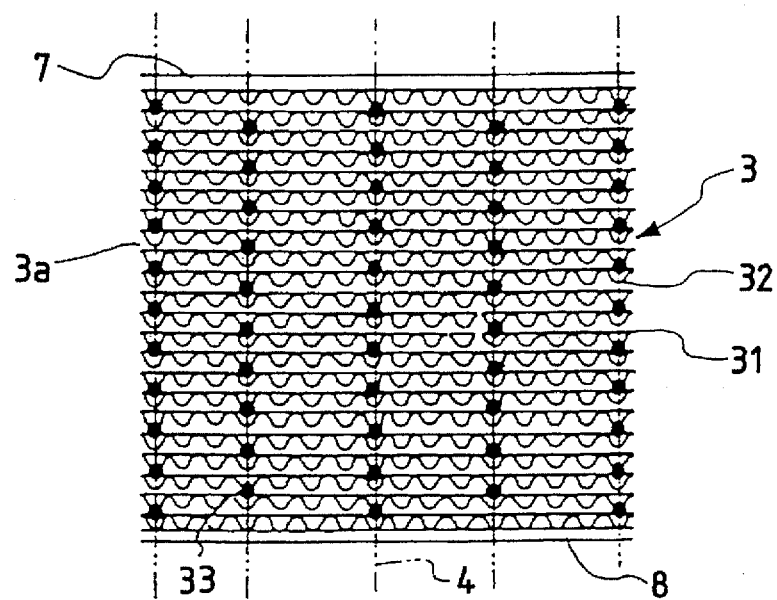
FIG. 5 is a front view showing the electric heater in accordance with the third embodiment of the present invention.

FIGS. 4 and 5 cooperatively show a third embodiment of the present invention. The third embodiment is characterized in that the shape of electric heater "H" is rectangular and multi-layered heat generator 3 is constituted by flat foil sheets 31 and corrugated foil sheets 32 alternately piled up or accumulated between a pair of parallel electrodes 7 and 8.

More specifically, a flat foil sheet 31 and a corrugated foil sheet 32 are bonded to each other to constitute a conductive foil strip 3a of the heat generator 3. The surface of each layer in conductive foil strip 3a is coated by an insulating material. Adjacent layer in conductive foil strip 3a are connected by a plurality of bonding parts 33.

In the settings of these bonding parts 33, there are provided a plurality of bonding lines 4 each extending in the direction perpendicular to the parallel electrodes 7 and 8.

These bonding parts 33 are alternately disposed along each bonding line 4, so as to prevent any two bonding parts 33, that are aligned on the same bonding line 4, from being consecutively located between neighboring two boundaries of conductive foil layers.

Furthermore, the bonding parts 33 are alternately disposed along same boundary of conductive foil layers (i.e. in the direction parallel to electrodes 7 and 8) so that any two bonding parts 33 are not located between neighboring two bonding lines 4.

For example, if a total of "n" bonding parts 33 are allocated on a same bonding line 4, a first bonding part 33 connects first and second layers, a second bonding part 33 connects third and fourth layers, - - - , a k-th bonding part 33 connects (2k−1) and 2k layers (k<n), - - - , and an n-th bonding part 33 connects (2n−1) and 2n layers.

Meanwhile, if a total of "m" bonding parts 33 are allocated on a neighboring bonding line 4, a first bonding part 33 connects second and third layers, a second bonding part 33 connects fourth and fifth layers, - - - , a j-th bonding part 33 connects 2j and (2j+1) layers (j<n), - - - , and an m-th bonding part 33 connects 2m and (2m+1) layers.

To satisfy the above-described alternate arrangement of the bonding parts 33, it is fundamentally necessary that the number of bonding lines 4 be an odd number (e.g. five in the embodiment shown in FIG. 5) when the heat generator 3 comprises separate layers stacked and electrically insulated from other except at bonding parts 33. In this separate multi-layer construction, it is desirable to put the outermost lines 4 on the opposite right and left edges of the heat generator 3.

On the contrary, the heat generator 3 may have a continuous multi-layer construction where each layer is electrically connected to an adjacent layer at one of its opposite ends. More specifically, as shown in FIG. 6, a long conductive foil sheet 31 is alternately folded at the right and left ends of the heat generator 3 so that adjacent layers are electrically connected through flat foil sheet 31 at either the right end or the left end as well as at bonding parts 33 provided along their boundary.

Figure 6:
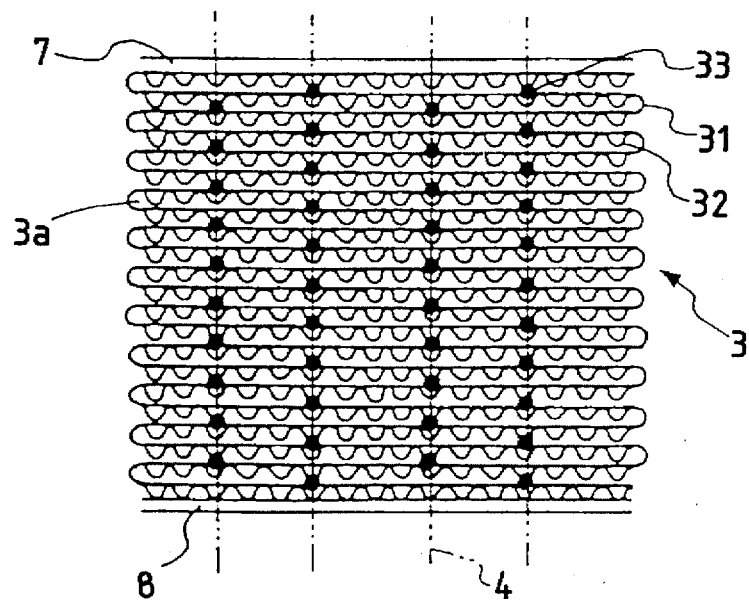
FIG. 6 is a front view showing a modified electric heater in accordance with the third embodiment of the present invention.
Figure 7A:
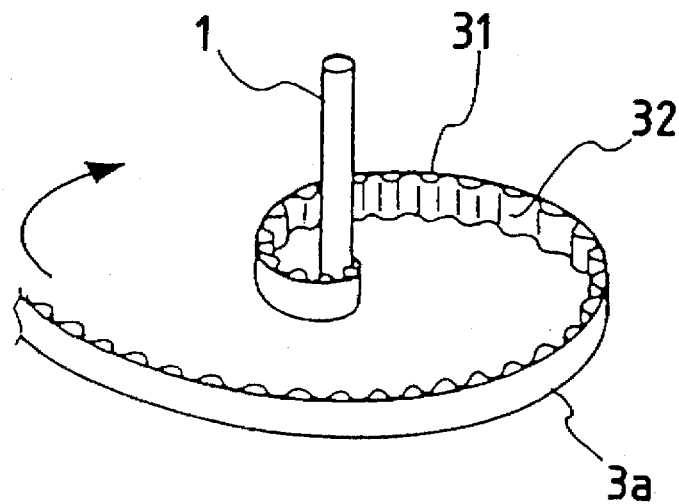
FIGS. 7A and 7B are views cooperatively showing a conventional electric heater.
Figure 7B:
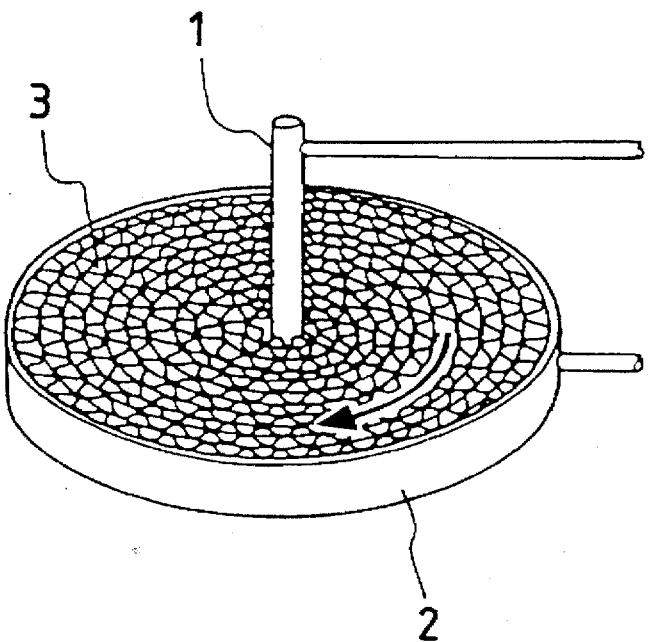
Figure 8A:
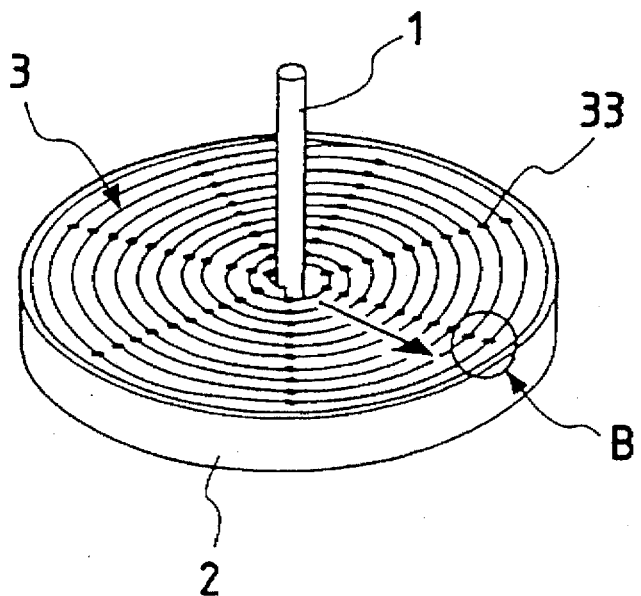
FIG. 8A is a view showing an electric path in accordance with the conventional electric heater and FIG. 8B is a view showing details of part "B" shown in FIG. 8B.
Figure 8B:
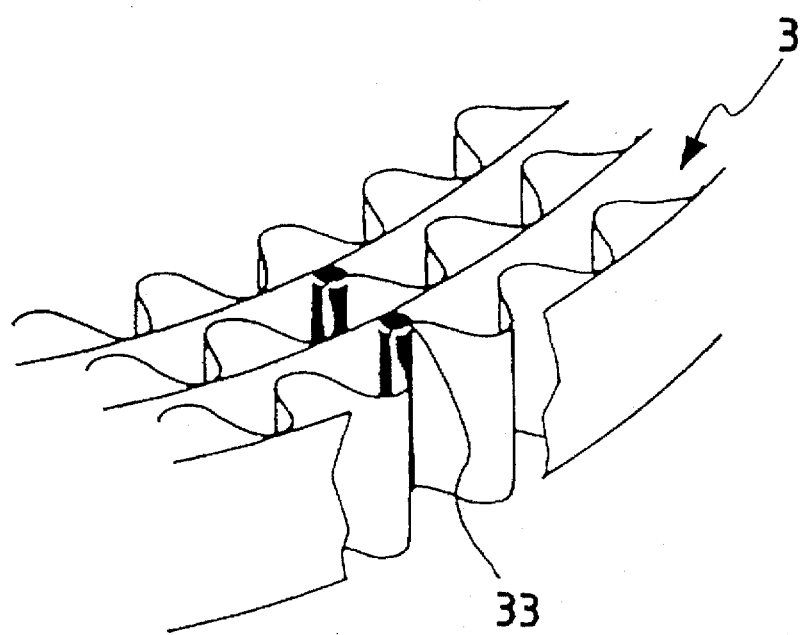
Figure 9A:
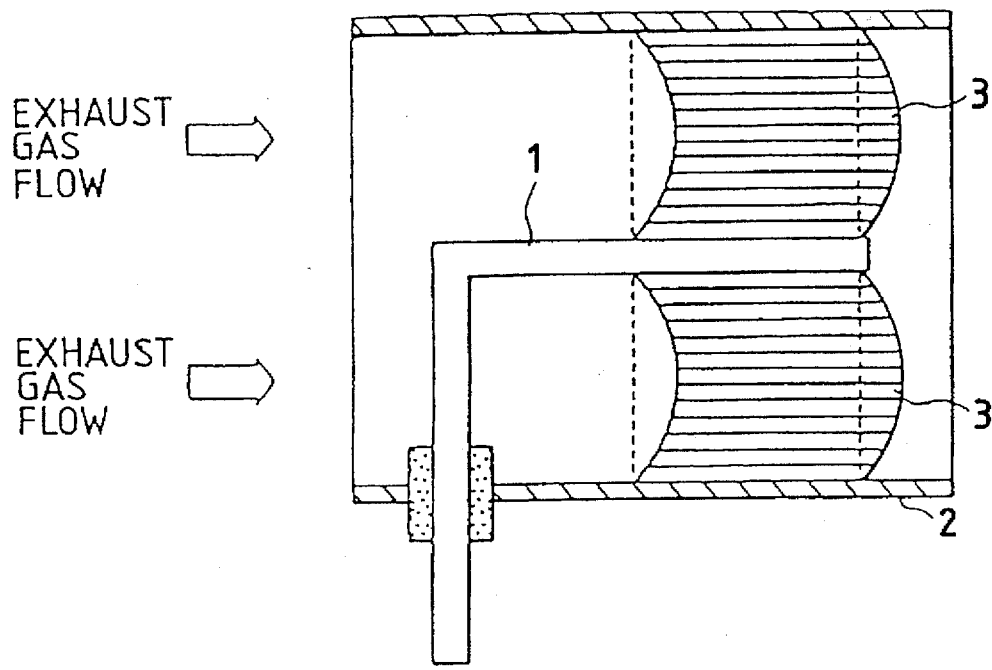
FIGS. 9A and 9B are views illustrating telescopic dislocation found in the conventional electric heater.
Figure 9B:
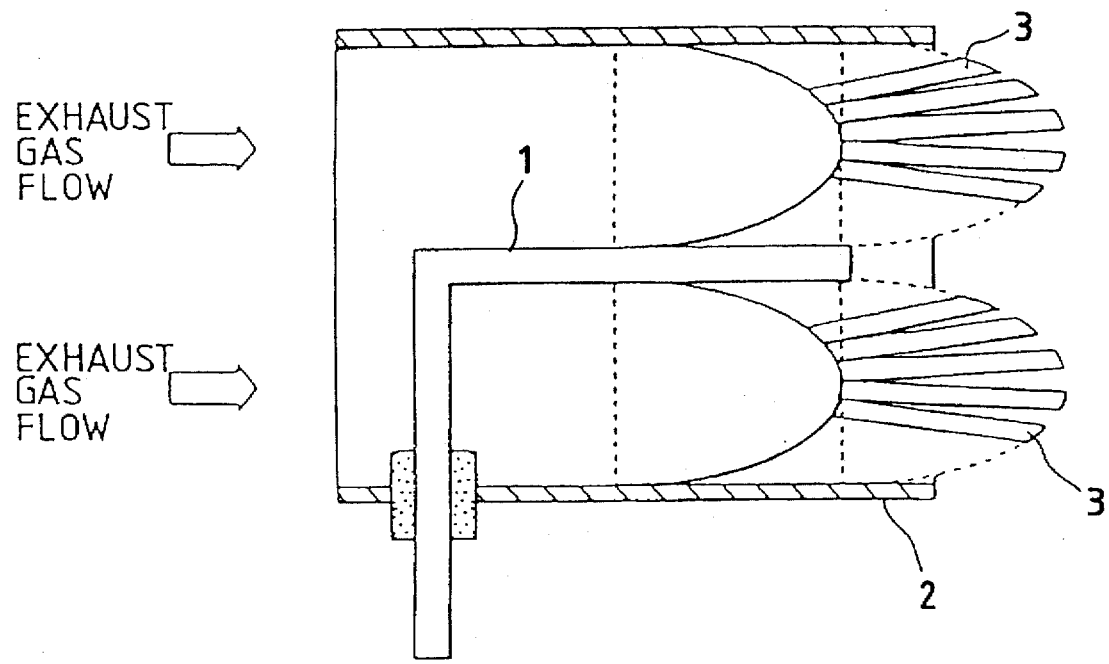

In this continuous multi-layer construction, the number of bonding lines 4 should be an even number (e.g. four in the embodiment shown in FIG. 6). In this case, it is desirable that the outermost lines 4 are offset from the opposite right and left edges of the heat generator 3 because a short-circuit path will be formed along the bonding line 4 when it is provided on the edge of the heat generator 3.

With this arrangement, electric current flows in a zigzag fashion along a current path connecting all of conductive foil layers between two bonding lines 4, without causing local concentration of current flow. Accordingly, it becomes possible to eliminate any locally concentrated heat generation, thereby realizing uniform heat generation across the entire surface of heat generator 3. Moreover, each of the conductive foil layers constituting the heat generator 3 is firmly fixed to the adjacent layers through plural bonding parts 33. This bonding arrangement makes it possible to prevent the heat generator 3 from causing undesirable telescopic dislocation of accumulated layers even when it is subjected to severe vibrations or increased flow of exhaust gas for a long time.

Although the above-described embodiments are explained based on the electric heater for exhaust particulate trap filter equipped in an exhaust gas passage of a diesel engine, the present invention is not limited to the disclosed embodiment. In other words, the present invention can be applied to any exhaust emission purification apparatus of any type of internal combustion engine, such as electric heater used for warming up a catalyst provided in an exhaust passage of a gasoline engine.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. An electric heater comprising:
a first electrode and a second electrode;
a multi-layered honeycomb body disposed between said first and said second electrodes acting as a heat generator, said multi-layered honeycomb body comprising a plurality of conductive foil layers which are electrically insulated from other conductive foil layers;
a plurality of bonding parts each defining an electrical conductive path between adjacent conductive foil layers, said bonding parts being disposed along a plurality of bonding lines extending across said plurality of conductive foil layers from said first electrode to said second electrode, wherein said bonding parts are disposed on every other conductive foil layer along each bonding line and said bonding parts are disposed on every other bonding line along each conductive foil layer.

2. The electric heater defined by claim 1, wherein said first electrode is a stick electrode and said second electrode is a ring electrode, said stick electrode being disposed at a center portion of said ring electrode, and said plurality of bonding lines extend in predetermined radial directions from said stick electrode.

3. The electric heater defined by claim 2, wherein said multi-layered honeycomb body is defined by winding a conductive foil strip around said stick electrode such that said plurality of conductive foil layers are defined by said conductive foil strip, and a number of said bonding lines is an odd number.

4. The electric heater defined by claim 2, wherein said plurality of conductive foil layers comprise independent ring layers arranged in a concentric manner between said stick electrode and said ring electrode, and a number of said bonding lines is an even number.

5. The electric heater defined by claim 2, wherein said bonding lines are uniformly spaced around said stick electrode at equal angular intervals.

6. The electric heater defined by claim 1, wherein said first and said second electrodes define two parallel electrodes, said multi-layered honeycomb body is disposed between said two parallel electrodes, and said bonding parts are aligned along the plurality of bonding lines extending in a direction perpendicular to said two parallel electrodes.

7. The electric heater defined by claim 6, wherein said multi-layered honeycomb body has a multi-layer construction where each conductive foil layer is electrically independent of other conductive foil layers, and a number of said bonding lines is an odd number.

8. The electric heater defined by claim 7, wherein outermost bonding lines are put on opposite edges of said honeycomb body.

9. The electric heater defined by claim 6, wherein said multi-layered honeycomb body has a continuous multi-layer construction where each conductive foil layer is electrically connected to an adjacent conductive foil layer at one end thereof, and a number of said bonding lines is an even number.

10. The electric heater defined by claim 9, wherein outermost bonding lines are offset from opposite edges of said honeycomb body.

11. The electric heater defined by claim 9, wherein each conductive foil layer is constituted by a flat foil sheet and a corrugated foil sheet, said flat foil sheet being alternately folded at opposite ends of said honeycomb body so that two adjacent conductive foil layers are electrically connected through said flat foil sheet.

12. The electric heater defined by claim 1, wherein each conductive foil layer is constituted by a flat foil sheet and a corrugated foil sheet, and each bonding part fully extends along an entire width of said flat foil sheet and said corrugated foil sheet so as to provide bonding parts whose total electric resistance is smaller than an electric resistance of the remainder of said honeycomb body.

13. The electric heater defined by claim 12, further comprising an auxiliary bonding part connecting said plurality of conductive foil layers, provided in a vicinity of said bonding part and offset therefrom a predetermined distance equivalent to a span of a corrugation of said corrugated foil sheet.

14. The electric heater defined by claim 2, further comprising an intermediate ring electrode provided between said stick electrode and said ring electrode in a concentric manner so as to separate said honeycomb body into inner and outer heat generating zones.

15. The electric heater defined by claim 14, wherein a number of said bonding lines is differentiated between said inner and said outer heat generating zones.

16. The electric heater defined by claim 15, wherein the number of bonding lines in said outer heat generating zone is smaller than the number of bonding lines in said inner heat generating zone, thereby increasing a heat generation amount at said outer heat generating zone.

17. An electric heater comprising:
  a first electrode and a second electrode;
  a multi-layered honeycomb body disposed between said first and said second electrodes acting as a heat generator, said multi-layered honeycomb body comprising a plurality of conductive foil layers which are electrically insulated from other conductive foil layers in a direction across said plurality of conductive foil layers;
  a plurality of bonding parts, each defining an electrical conductive path between adjacent conductive foil layers, said bonding parts being disposed along a plurality of bonding lines extending across said plurality of conductive foil layers from said first electrode to said second electrode,
  wherein "n" bonding parts are aligned on a bonding line, a k-th bonding part electrically connects (2k−1) and 2k conductive foil layers, where k=1, 2, - - -, n, while "m" bonding parts are aligned on a neighboring bonding line, a j-th bonding part electrically connects 2j and (2j+1) conductive foil layers, wherein j=1, 2, - - -, m.

18. An electric heater comprising
  a first electrode and a second electrode;
  a multi-layered honeycomb body disposed between said first and said second electrodes, said multi-layered honeycomb body comprising a plurality of conductive foil layers, each conductive foil layer being electrically insulated from adjacent conductive foil layers in a direction across said conductive foil layers;
  a plurality of bonding parts comprising a first, a second, a third and a fourth bonding part, wherein said first bonding part and said second bonding part are disposed on a first bonding line extending across said plurality of conductive foil layers and said third bonding part and said fourth bonding part are disposed on a second bonding line also extending across said plurality of conductive foil layers, wherein bonding parts aligned on the same bonding line are disposed on every other conductive foil layer and wherein said first, said second, said third and said fourth bonding parts are not disposed on the same conductive foil layer.

* * * * *